United States Patent [19]
Sato

[11] Patent Number: 4,746,227
[45] Date of Patent: May 24, 1988

[54] SLIDE GUIDE OF PRESS

[75] Inventor: Mitsuo Sato, Sagamihara, Japan

[73] Assignee: Aida Engineering, Ltd., Sagamihara, Japan

[21] Appl. No.: 893,159

[22] Filed: Aug. 5, 1986

Related U.S. Application Data

[63] Continuation-in-part of Ser. No. 656,896, Oct. 2, 1984, abandoned.

[30] Foreign Application Priority Data

Nov. 11, 1983 [JP] Japan .................................. 58-212184

[51] Int. Cl.⁴ ........................ F16C 33/10; F16C 29/02; F16C 29/12
[52] U.S. Cl. ........................................ 384/13; 384/30; 384/40; 384/42
[58] Field of Search ..................... 384/7, 9, 12, 13, 14, 384/30, 39, 40, 42

[56] References Cited

U.S. PATENT DOCUMENTS

| | | | |
|---|---|---|---|
| 2,343,533 | 3/1944 | Burnham | 308/5 R |
| 3,479,097 | 11/1969 | McLauchlam et al. | 308/5 |
| 3,511,544 | 8/1967 | Marley | 308/5 R |
| 3,663,072 | 3/1972 | Cvacho | 308/5 R |
| 3,677,612 | 7/1972 | Barnett et al. | 308/5 |
| 3,903,993 | 9/1975 | Vorrhees et al. | 384/12 X |
| 3,913,375 | 10/1975 | Benker, Jr. | 72/463 |
| 4,523,410 | 6/1985 | Yoshioka et al. | 384/13 X |

FOREIGN PATENT DOCUMENTS

| | | | |
|---|---|---|---|
| 804396 | 4/1951 | Fed. Rep. of Germany | 384/42 |
| 2434769 | 2/1976 | Fed. Rep. of Germany | 384/40 |
| 1372163 | 8/1964 | France | 384/13 |
| 802155 | 10/1958 | United Kingdom | 384/13 |

*Primary Examiner*—Stuart S. Levy
*Assistant Examiner*—Thomas R. Hannon
*Attorney, Agent, or Firm*—Holman & Stern

[57] ABSTRACT

A slide guide for a press comprises a pair of sliding surfaces for slide side and frame side arranged at four corners at the left and right sides as well as the front and rear sides of the press slide to maintain the set clearance constant and each slide's side sliding surface is provided with acclivities, parallel faces and declivities alternately in the sliding directions which produces a wedge-shaped oil film thereon and the effect of the wedging action of the oil film is heightened by properly setting a wedge angle formed by the acclivities and declivities in accordance with the slide's ascending/descending speeds so that the oil film generates a separating force to wedge off the slide side and frame side sliding surfaces, thereby enabling the slide's high speed motions to remain highly accurate without producing oil film breakdown even when the clearance is set minimal. The clearance is adjustable by adjusting devices and lubricant is applied to the sliding surfaces by a forced circulatory lubrication system.

4 Claims, 7 Drawing Sheets ated Oct. 2, 1984, and
SLIDE GUIDE OF PRESS

CROSS REFERENCE TO RELATED APPLICATION

This application is a continuation-in-part of U.S. application Ser. No. 06/656,896 filed Oct. 2, 1984, and which is now abandoned.

BACKGROUND OF THE INVENTION

1. Field of the Invention

The present invention relates to a slide guide for a press.

2. Description of the Prior Art

In press machinery, a slide to conduct ascending/descending movements and a sliding surface on the press frame side to guide the slide movements have heretofore been so arranged that their surfaces each have an oil groove thereon and are opposite and parallel to each other. That is, a sliding surface of the slide fitted with liners parallel to each other and oil grooves made on each liner's surface have been arranged opposite and parallel to a plane surface of the slide gib fitted to the press frame portion, i.e. to the press proper, and a clearance between both plane surfaces of the liner and slide gib has been maintained properly by adjusting a position of the slide gib. In a lubrication system utilizing this oil groove, an area of the sliding surface is considerably larger as compared with that of oil groove, so that an effect to wedge off both surfaces each other by the function of the oil film formed thereon.

This makes it difficult to compensate for an increase in the clearance resulted from wear of the sliding surface by means of the oil film and also to maintain a high accuracy. For this reason, the operator, or the person in charge of these presses must always pay attention to keep the clearance optimal by adjusting the position of the slide gib whenever the clearance increases.

Also, in such prior art machines, it is very difficult to adjust the whole clearance of the parallel sliding surfaces finely. Moreover, in slide guides of the prior art, there were the unavoidable drawbacks that the oil film is sometimes apt to break and as a consequence the wear and heat of the liner is also apt to increase when running the slide at high speed, and that frequent adjustment of the clearance or work to expand the clearance must be carried out.

SUMMARY OF THE INVENTION

It is, therefore, a principal object of the present invention to eliminate such defects of prior art machines and to provide an improved slide guide for a press which is free from oil film breaking and with which it is possible to maintain a high working accuracy constantly by a mechanism wherein the sliding surface of the liner is made in a form having acclivity, face parallel to the mated sliding surface and declivity alternately in the sliding directions and the area of the parallel face is made smaller relatively to that of the acclivity and declivity and a separating force to wedge off the slide liner's sliding surface and slide gib's sliding surface is redoubled by the effect of wedging action of the oil film even when the clearance between said both sliding surfaces are set minimal by properly enlarging a slope angle formed by the acclivity and declivity in accordance with the increase of slide's ascending/descending speeds.

BRIEF DESCRIPTION OF THE DRAWINGS

The invention will now be described in detail with reference to the accompanying drawings wherein.

DETAILED DESCRIPTION OF THE INVENTION

Figure 1:
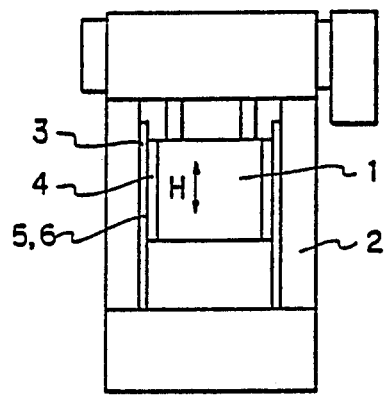
FIG. 1 is a schematic front elevation view of the press employed in an embodiment of the present invention.
Figure 2:
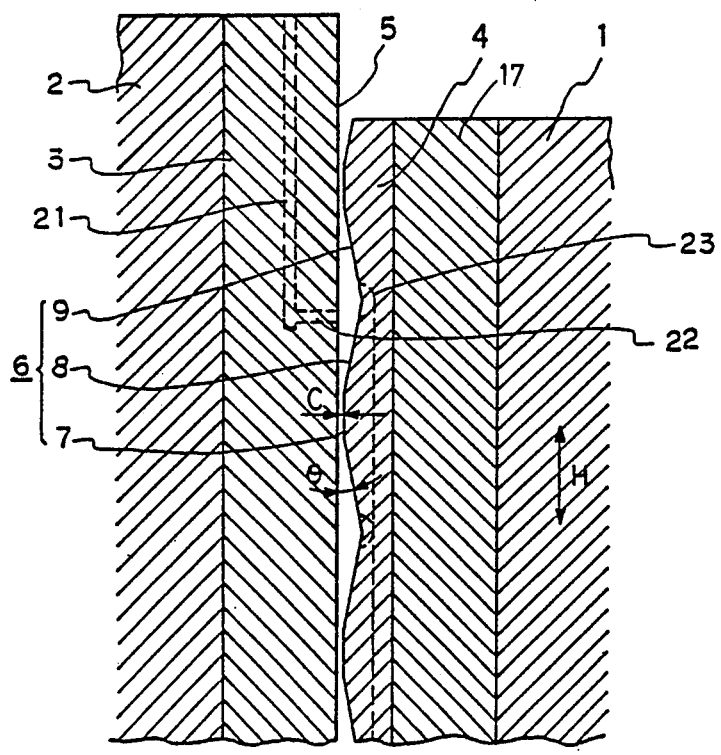
FIG. 2 is an enlarged fragmentary cross-sectional view of the principal part of the press of FIG. 1.

Initially, referring to FIGS. 1 and 2, a sliding surface 5 of the present embodiment is provided on slide gib 3 between liner 4 attached to a slide 1 and slide gib 3 attached to the press frame 2.

FIG. 2 shows sliding surface 5, 6 on liner 4 which is opposite to slide gib 3. The sliding surface 5 of the slide gib 3 has a plane configuration in the sliding directions H and, the sliding surface 6 of the liner 4 has a plurality of surfaces 7 parallel to the mating sliding surface 5 and declivities 8 as well as acclivities 9 alternately in the sliding directions H.

Figure 3:
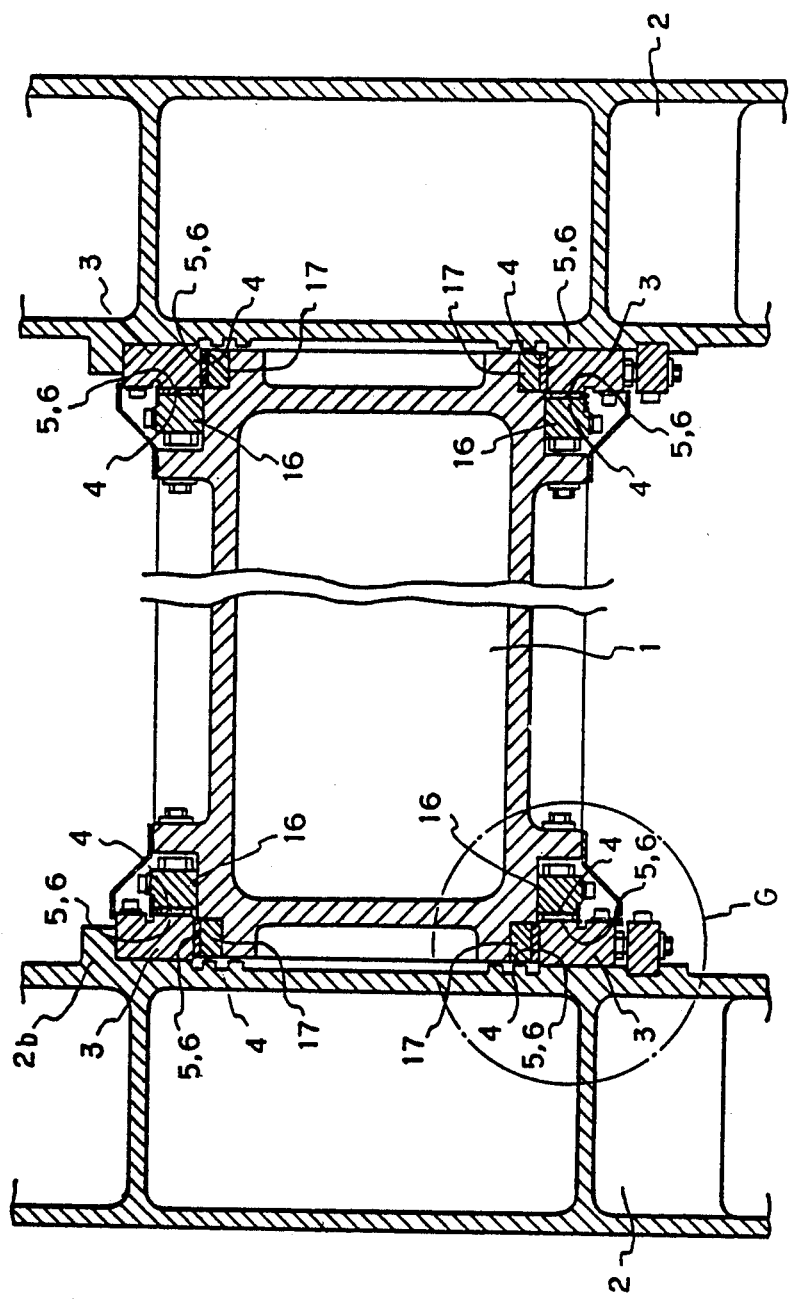
FIG. 3 is a transverse cross-sectional view of the slide guide of a press in accordance with the present invention which is provided with the sliding surface at eight positions of the press slide.
Figure 4:
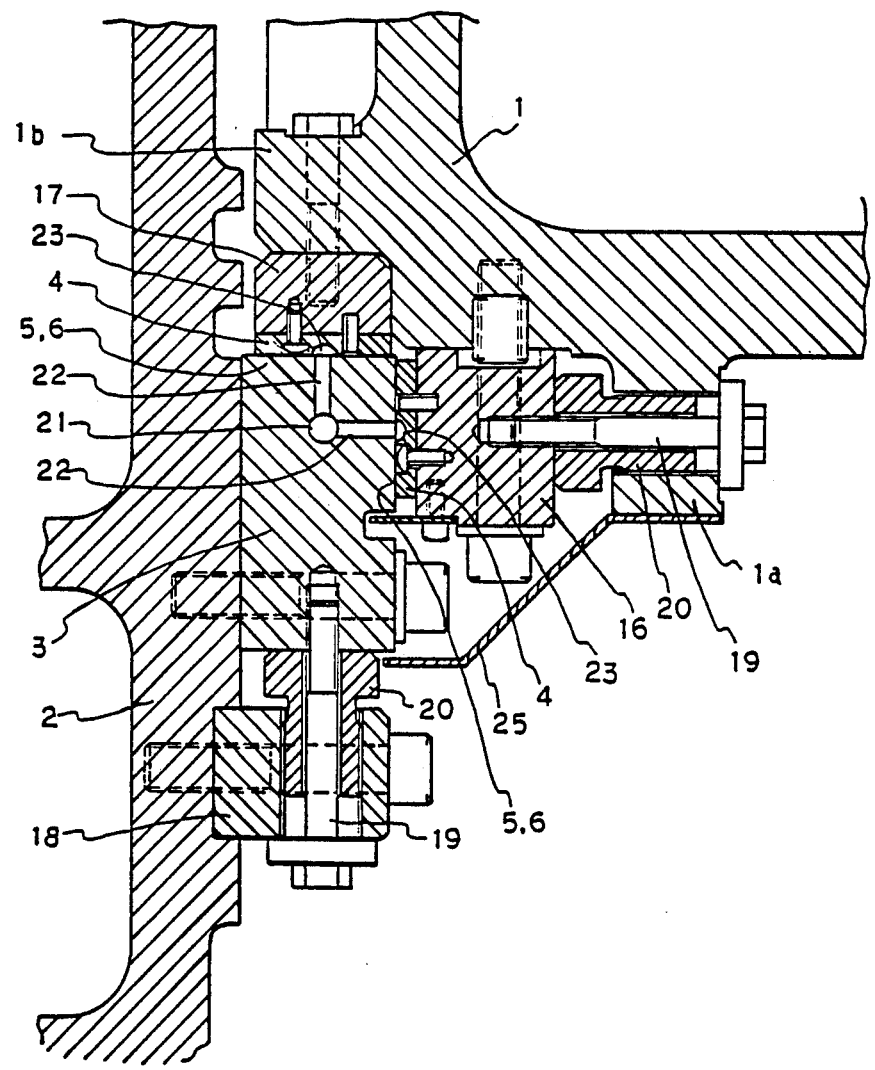
FIG. 4 is an enlarged detail view of one corner as enclosed by a circle G in FIG. 3.

The slide guide of the press of the present invention, as shown in FIGS. 3 and 4, has sliding surfaces 5, 6 at eight positions total on the left and right portions as well as the front and rear portions at the four corners of the slide 1. Each liner 4, located at the four positions on the front and rear sides of the slide, is fixed to the slide 1 through a fixing plate 17 and, those at the four positions on the left and right sides of the slide are each attached to an adjusting plate 16, which is movable to the left and right of the slide 1 by means of push-bolts 20 and pull-bolts 19 which are screwed into a projection 1a of slide 1. The sliding surfaces 5 on each slide gib 3 opposite to the respective sliding surfaces 6 are made by directly hardening the surfaces of the slide gib 3 itself.

Each slide gib 3 located at the rear side is fixed to the press frame 2 and contacts respective projected contact portion 2b on the left and right side frames 2 and each slide gib 3 located at the front side is adjustable forwardly and backwardly on the left and right side frames 2 by means of push-bolts 20 and pull-bolts 19 which are screwed into a respective fixing block 18 mounted on the left and right side frames 2.

Thus, the adjustments of the clearance S between slide guide's sliding surfaces 5,6 at the left and right can be attained by operating the adjusting plates 16 arranged at the four positions of the slide 1 and respective liners 4, and the adjustments of the clearances at the front and back can be accomplished by adjusting the front side slide gibs 3 forwardly and backwardly through blocks 18 attached to the press frame 2.

Figure 5:
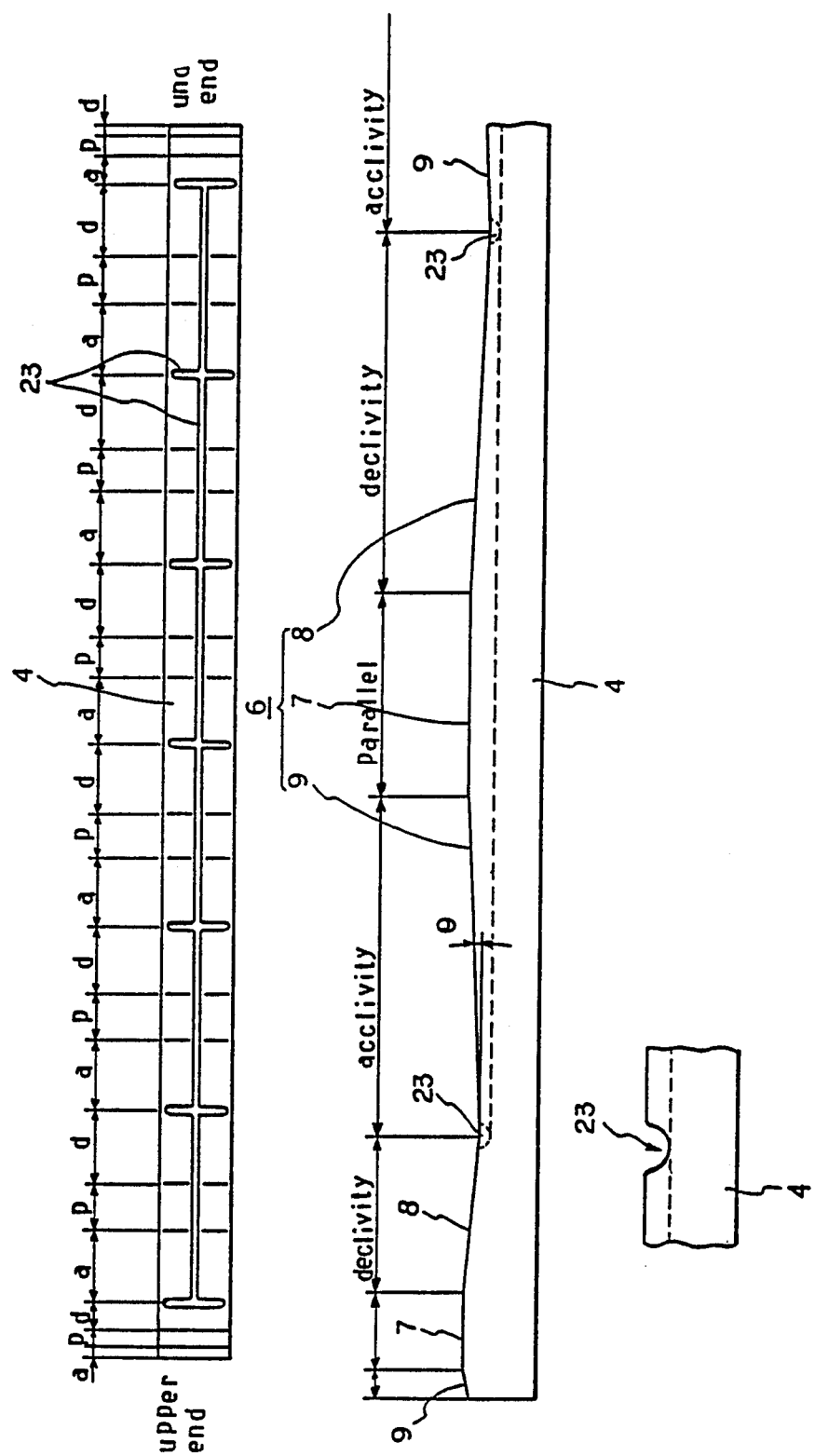
FIG. 5 is a view showing the configuration of the sliding surface of a liner attached to the slide in accordance with the invention.

Referring then to FIG. 5, the shape of each liner's sliding surface 6 is minutely illustrated therein and comprises a structure possessing several portions of acclivity 9, parallel surface 7 and declivity 8 alternately extending from upper end to lower end of the sliding surface. Oil groove 23 has several transverse oil groove portions at right angles to the sliding directions arranged at junctions of each declivity 8 and acclivity 9 in a shape smaller than the width of liner 4 and a longitudinal oil groove portion running in the nearly central portion of liner 4 in the sliding directions between the uppermost and lowermost transverse oil groove portions.

Figure 6:
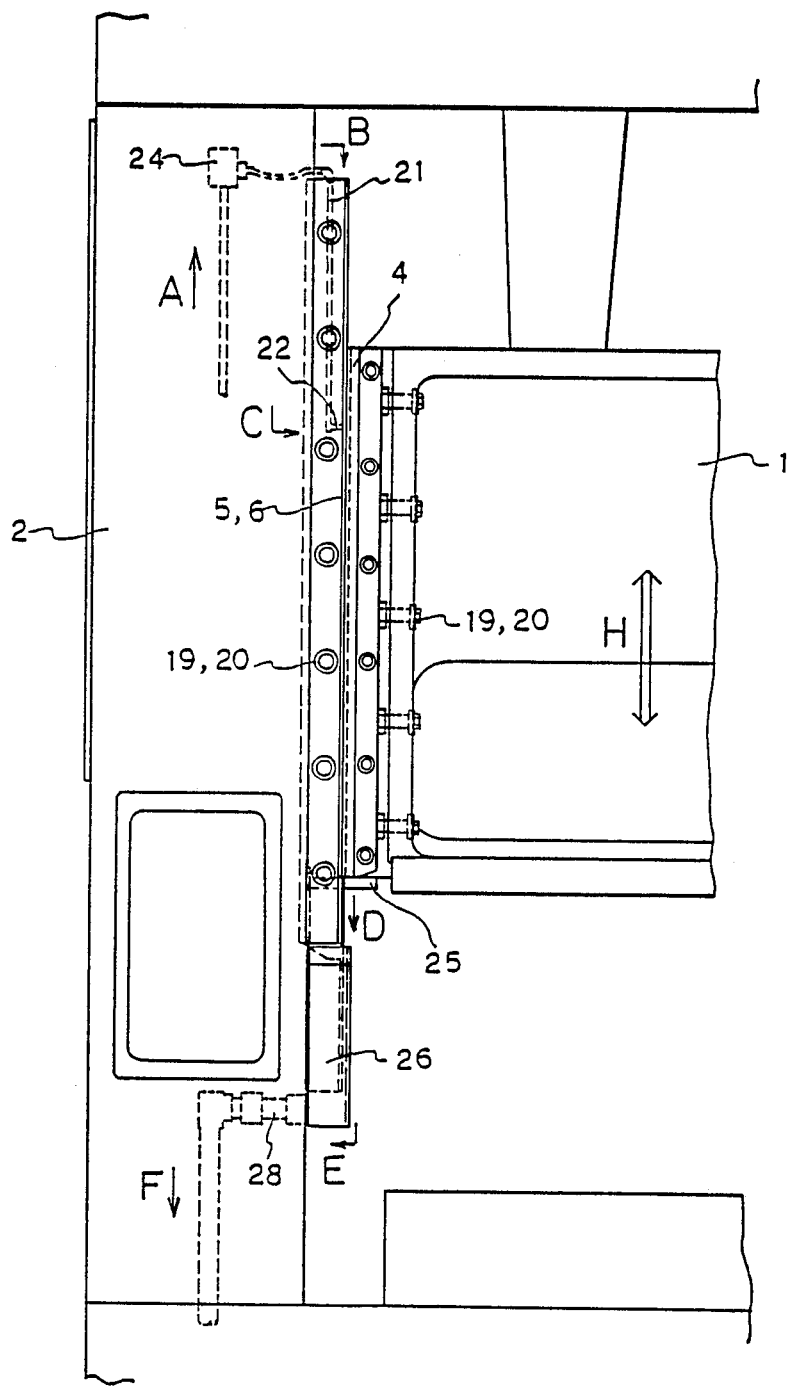
FIG. 6 is a reference diagram showing the manner in which the lubricant is applied on the sliding surfaces in the present invention.
Figure 7:
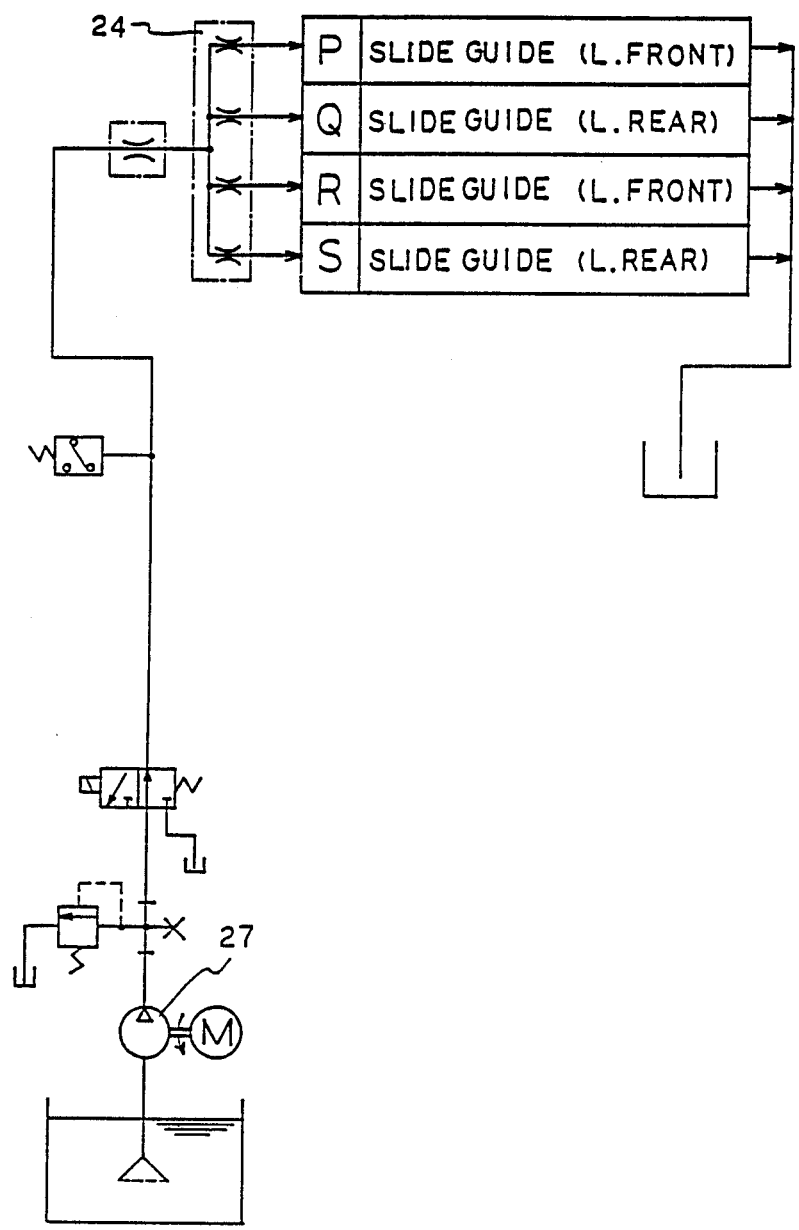
FIG. 7 is a lubrication system diagram showing how the lubricant is applied to the sliding surfaces.

The lubricant is applied to the sliding surfaces 5,6 by an oiling pump 27 arranged inside the press frame 2 through a distribution valve 24 as shown in FIGS. 6 and 7. The four slide gibs 3 attached to the press frame 2 are each provided with a longitudinal oil aperture 21 in the central portion thereof and right angle branches between 22 therefrom to provide front- and rear side transverse oil apertures as well as left- and right side transverse oil apertures. The outlet of each transverse oil aperture 22 is arranged to be opposite to an upper portion of the longitudinal oil groove 23 formed on the aforementioned liner 4.

An appropriate quantity of lubricant is supplied to oil groove 23 of each liner 4 through longitudinal oil aperture 21 and transverse oil aperture 22 of the slide gib 3 from the distribution valve 24 and serves to lubricate the sliding surface 5,6 from oil groove 23. The lubricant flowing out from sliding surfaces 5,6 is gathered into slide side oil receiver 25 arranged at lower portions of the sliding surfaces 6 in the four corners of the slide 1 and then flows into frame side oil receiver 26 arranged at lower portions of slide gibs 3 fitted to the press frame 2 and finally it is returned to the oil tank inside the press frame 2 through an exhaust oil pipe 28. The circulatory lubrication is consecutively carried out through the paths A→B→C→D→E→F as shown in FIG. 6.

The action of the slide guide of the invention will now be described.

Initially, let it be supposed that each clearance C between sliding surfaces 5, 6 of the front/rear sides as well as the left/right sides was set minimal by adjusting the aforementioned pull-bolts 19 and push-bolts 20. The liner's sliding surface 6 has such a shape that the ratio of the total areas of acclivity 9 and declivity 8 to the area of the parallel surface 7 amounts to 10:2~4.

Accordingly, in the slide guide of the invention, a mere adjustment of the parallel surface 7 alone suffices to keep the slide motion accurate, whereas the whole surface, in the conventional slide guide, would have to be adjusted equally to accomplish the same purpose.

Consequently, the time required for clearance adjustment is drastically shortened to less than ⅓ as compared with the conventional slide guide and it is possible to set the clearance to the minutest dimensions less than ½ that in a conventional press.

The present invention will now be described in regard to the circulatory lubrication system to apply the lubricant to the sliding surfaces and to make the ascending and descending motions of the slide 1 smooth.

Initially, in supplying the lubricant to the sliding surfaces 5,6, a wedge-shaped oil film will be formed between declivity 8 and acclivity 9 on the liner 4 and plane surface of the slide gib 3. For a wedge-shaped oil film, it is known that the oil film generates a high pressure in the normal line direction between both sliding surfaces. That is, when the liner 4 is moved upward or downward together with the slide 1, the oil film will act to generate high pressure between the slopes 8 and 9 and slide gib 3 in the normal line direction and at the same time a separating force to widen the clearance C between parallel surface 7 of the liner 4 and slide gib 3 will be generated. The more the ascending and descending speeds of the slide 1 become, the higher the separating force. As a result, the wear of the sliding surfaces will be reduced.

As the sliding movement of both sliding surfaces 5, 6 continues, the lubricant flowing out from the wedge-shaped oil film is recirculated between parallel surface 7 and slide gib 3, thus providing a flowing oil film between parallel surface 7 and slide gib 3 at all times. Accordingly, even though the clearance C is set to the minutest value, less than ½ that of a conventional press, the accuracy of the clearance can strictly be maintained at all times and in consequence the wear reduction of the sliding surface can also be realized.

A functional effect of the oil film can be increased by enlarging the wedge angle "θ" formed by the inclination of declivity 8 with respect to the longitudinal axes of liner 4, and correspondingly modifying the inclination of acclivity 9, as well as the slide gib 3 according to the increase of the slide's ascending/descending speeds. However, if the wedge angle "θ" is excessively enlarged, the possibility that a quantity of oil will flow out from the side portion of the liner 4 increases naturally. Therefore, it is advisable to set the wedge angle "θ" to 1° or less.

In addition to the above, using a high viscosity lubricant for this purpose will make it possible to keep a highly accurate slide motion constant in the same mechanism as in an embodiment having the aforementioned minimal clearance by the aid of oil film even when clearance C is large to some degree.

The wedge angle "θ" must be so determined that the effect of said wedging action is optimal in accordance with the ascending/descending speeds of the slide 1 and the viscosity of the lubricant. In actual experiences, the following result is obtained. That is, in the slide guide of the invention, when the wedge angle is 10', the value "SN" which is the product of "stroke length (S)" and "SPM (N)" amounts to 1.7 times that of a conventional slide guide in which the sliding surface is plane over the entire surfaces and parallel to the mated sliding surface, as shown in the table below.

|  | STROKE LENGTH (S) | SPM(N) | SN-VALUE |
|---|---|---|---|
| CONVENTIONAL SLIDE GUIDE | 150 | 120 | 18,000 |
| SLIDE GUIDE OF THE INVENTION | 250 | 120 | 30,000 |

As shown above, in the slide guide of this invention, a high speed guiding performance is furthermore heightened.

Figure 8:
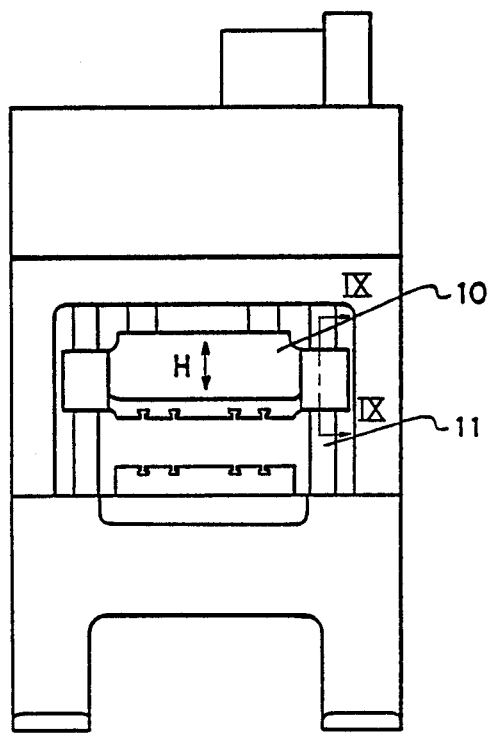
FIG. 8 is a schematic front elevational view of a post guide type press in which the sliding surface has a tapered-shape.
Figure 9:
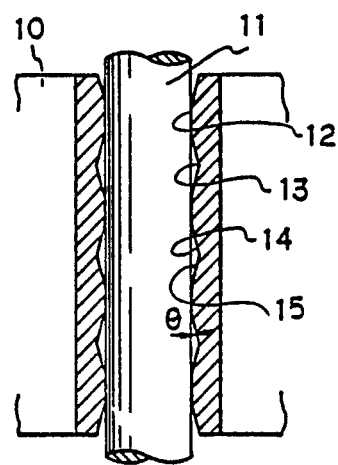
FIG. 9 is a fragmentary cross-sectional view taken along line IX—IX in FIG. 8.

Referring to FIGS. 8 and 9, another embodiment of the present invention is illustrated therein. A post guide-type slide 10 of this press is guided freely ascendable and descendable by the post guide 11 which is attached to the press frame and its cross-section is round. The shape of the post guide is not necessarily limited to such round type.

The post-guide type slide 10 guided by the post guide 11 has a plurality of cylindrical face portions 12 which are parallel to the mated surface at right angles to the sliding directions and their plane sections are round, and conical bottom portions 13 alternately in the sliding directions of the sliding surface. Each conical bottom portion 13 comprises an underspread headless conical face 14 and an upperspread headless conical face 15. A slope angle of each conical face is each designated as "$\theta$". This wedge angle "$\theta$" is properly set in the same manner as the aforementioned embodiment according to the ascending/descending speeds of the post-guide type slide 10 and the viscosity of lubricant used. The functional effect of the present invention applied to the post-guide type slide is identical with that of the aforementioned embodiment.

As can be understood from the aforementioned description, according to the present invention, a strong separating force to wedge off the slide side's sliding surface and the frame side's sliding surface is generated by the action of the oil film formed on the sliding surface. This separating force acts to prevent breaking of the oil film on the sliding surface and to lessen the wear of the sliding surface and also to keep the perpendicularly ascending/descending motions of the slide highly accurate even when the clearance between the sliding surfaces is minimal.

Also, even if the clearance between the sliding surfaces increases, upgrading the viscosity of lubricant will make it possible to produce the same effect as in the case where the clearance is small by the action of the oil film, and in consequence to keep the slide motion highly accurate.

Moreover, when the slide's ascending and descending speeds have to be increased, enlarging the wedge angle "$\theta$" will make it possible to maintain the functional effect of the wedge-shaped oil film constant, so that the application with high-speed presses will be ensured.

The liner's sliding surface under the present invention possesses several slopes and parallel faces alternately thereon and a total area of the parallel faces are designed to be smaller than that of the slopes, so that a setting of the smallest clearance ranging from top to bottom of the liner is simplified.

Moreover, as the sliding surface is arranged at eight positions total on the left and right sides, as well as the front and rear sides, and the clearance between the sliding surfaces is freely and finely adjustable by operating either of the push- or pull-bolts, ease of clearance adjustment is accomplished and, even when the eccentric load is burdened, the clearance between the sliding surfaces can strictly be kept constant.

Furthermore, since a forced circulatory lubrication system to supply the lubricant under pressure onto the sliding surface is introduced into the slide guide, the oil film is always retained on the sliding surface.

Thus, the effects and advantages in the practical use of the slide guide of the present invention are very extensive and extremely great.

I claim:

1. A slide guide for guiding the press slide of an ascending and descending press comprising:

a press frame having a front, a rear, and right and left sides;

a press slide having a front, a rear and right and left sides and having four corners slidably guided on said press frame;

a slide gib on said press frame at each corner of said press slide and having two longitudinal plane sliding services, the slide gibs on the left side having respectively a forward and a rearwardly facing sliding surface and two sliding surfaces facing towards the right, and the slide gibs on the right side having respectively a forwardly and a rearwardly facing sliding surface and two sliding surfaces facing toward the left;

adjustable means on said frame operatively connected to the slide gibs at the front for adjusting the front gibs forwardly and rearwardly;

two liners mounted on each corner of each slide, each said liner having a longitudinal plane sliding surface facing oppositely to a respective sliding surface on the respective slide gib at each corner for sliding engagement therewith;

said liners having sliding surfaces opposite to the forwardly and rearwardly facing sliding surfaces on said gibs being fixed to said slide;

said liners having sliding surfaces opposite to the right and left facing sliding surfaces on said gibs being adjustably mounted on said slide by adjustable means for adjustment to the right and left, respectively, said liner adjustment means comprising an adjusting plate for each said liner disposed opposite to respective right and left facing sliding surfaces on said gibs;

the sliding surfaces on each liner comprising a plurality of spaced faces parallel to the plane surface of a respective opposite sliding surface on a respective gib, a declivity extending from one end thereof at the upper end of a respective parallel face and slanting in a direction away from the plane sliding surface of the respective gib, and an acclivity extending from the other end of said declivity to the lower end of another respective parallel face and slanting at an angle with respect to said declivity.

2. A slide guide as claimed in claim 1 wherein a lubrication circuit is provided for circulation of lubricant from a source of lubricant comprising:

a longitudinal oil aperture extending from the upper end of each slide gib through the central portion thereof;

an oil aperture opening in the central portion of the sliding surface of each slide gib communicating with said longitudinal oil aperture for supplying oil between the sliding surfaces of the respective liners and slide gibs;

an oil groove extending longitudinally in the central portion of the sliding surface of each liner; and an oil tank, said oil passing via lower ends of said liners and slide gibs to said oil tank.

3. A slide guide for a press as claimed in claim 2 wherein: the ratio of the total area of said acclivity and declivity to the total area of said parallel faces is 10:2–4.

4. A slide guide for a press as claimed in claim 1 wherein: the ratio of the total area of said acclivity and declivity to the total area of said parallel faces is 10:2–4.

* * * * *